Patented July 9, 1935

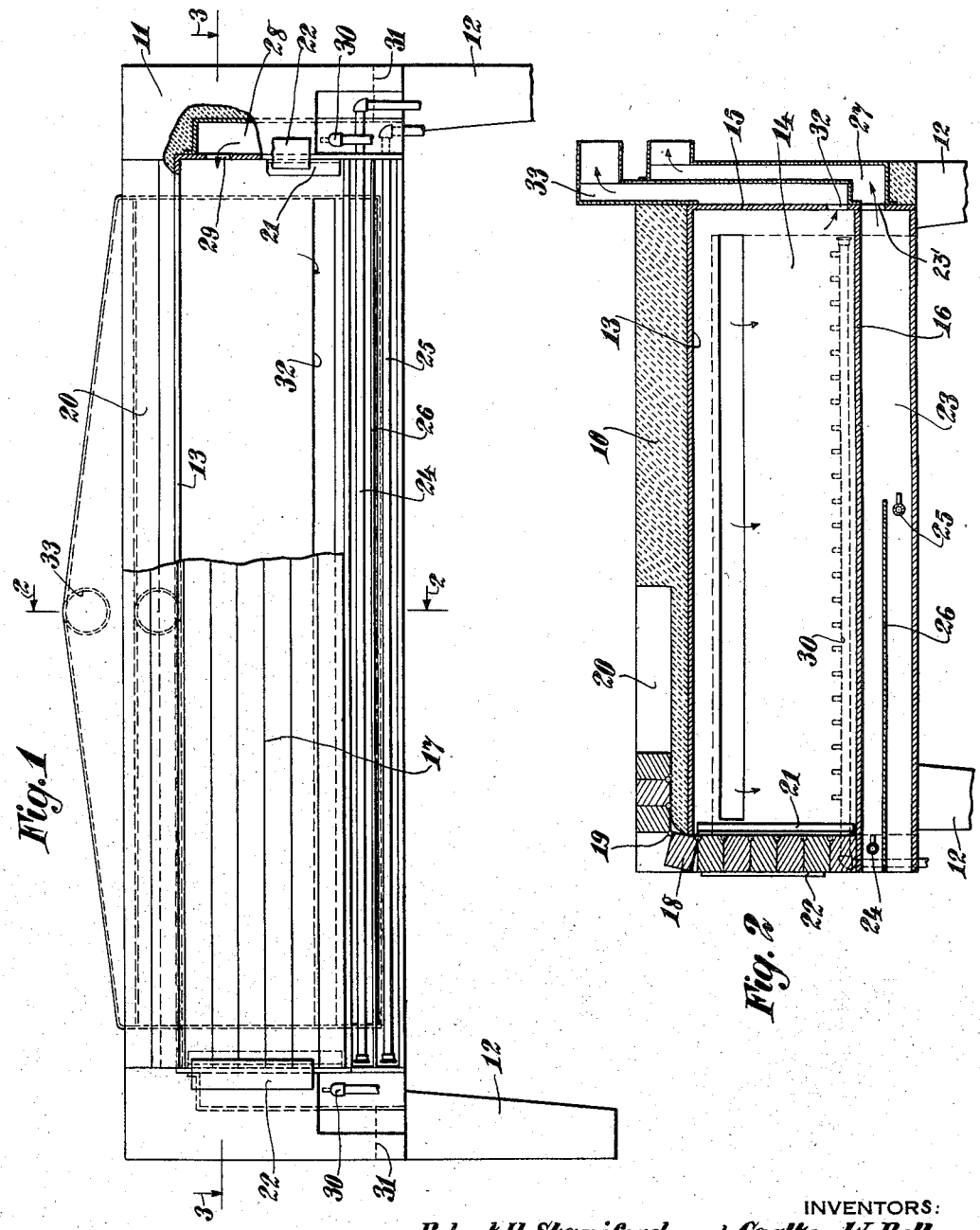

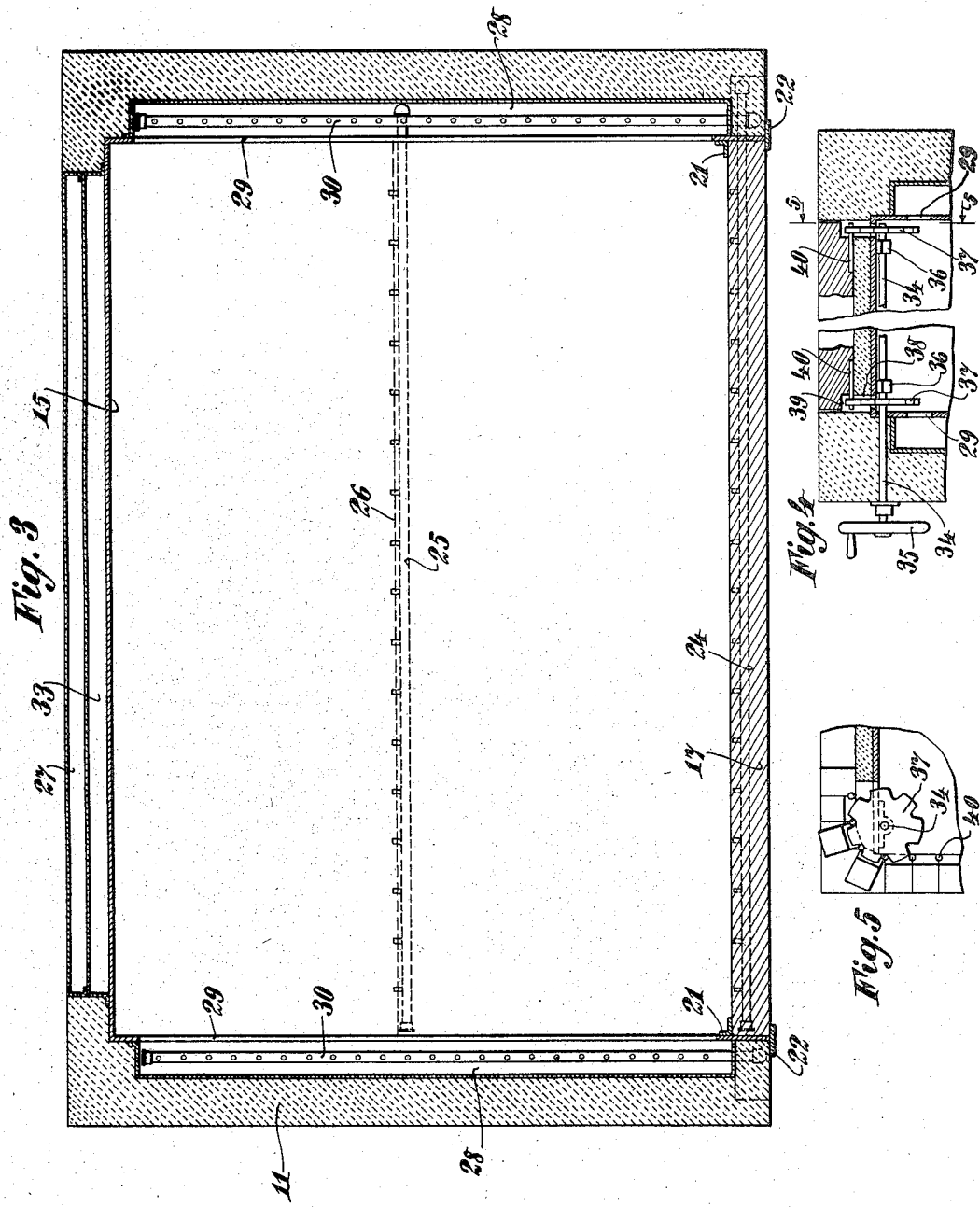

2,007,620

UNITED STATES PATENT OFFICE 2,007,620

OVEN

Robert H. Staniford and Carlton W. Roll, Brooklyn, N. Y., assignors to Madabar, Inc., Brooklyn, N. Y., a corporation of New York Application August 19, 1933, Serial No. 685,880

8 Claims. (Cl. 107—55)

The present invention relates to ovens and embodies, more specifically, an improved form of oven, the hearth of which is adapted to be heated by separate heat sources. More particularly, the invention embodies an oven having a stationary hearth with a combustion chamber beneath the hearth to supply bottom heat thereto and separate combustion chambers for supplying products of a combustion into the oven above the hearth.

Baking operations can be carried out most effectively when the temperature within the oven is maintained uniformly throughout all portions thereof. In order that a uniform oven temperature may be preserved and effectively regulated, the present invention has been designed and an object thereof is to provide an improved oven wherein separate sources of heat are provided for supplying heat to the bottom of the oven and to the top, respectively.

A further object of the invention is to provide an improved stationary oven having a hearth, the bottom of which is effectively and uniformly heated by a bottom heat source and the top of which is heated by a separate and independent source of heat.

A further object of the invention is to provide an oven having a combustion chamber beneath the hearth thereof, the combustion chamber being provided with a plurality of burners positioned in such fashion that uniform and effective heating of the bottom of the hearth is had, the heating being accomplished more efficiently than in present constructions.

A further object of the invention is to provide an oven having a bottom heat source and separate top heat sources which supply heat to the oven chamber adjacent the top thereof, means being provided to permit the escape of the top heat from the oven adjacent the hearth thereof.

A further object of the invention is to provide an oven having a top heat source which supplies heat to the oven chamber adjacent the top thereof, an oven door being provided by means of which inspection of the contents of the oven may be conveniently carried out without losing the heat within the oven adjacent the top thereof.

A further object of the invention is to provide an oven having a stationary hearth beneath which a bottom heat chamber is provided, top heat sources being provided at the sides of the oven and directing heated products of combustion into the oven adjacent the top thereof, the heat sources and flue passes thereof being separate and independent.

A further object of the invention is to provide an oven having a bottom heat chamber beneath the hearth thereof, the bottom heat chamber having a plurality of burners, one of which burners serves as a preheating means for the secondary air supplied to the other of the burners.

A further object of the invention is to provide an oven having a bottom heat chamber beneath the hearth thereof, the bottom heat chamber having a plurality of burners each having a separate secondary air supply.

Further objects of the invention will be readily apparent as it is described in connection with the accompanying drawings, wherein:

Figure 1 is a view in front elevation, partly broken away and in section, showing an oven constructed in accordance with the present invention.

Figure 2 is a view in section, taken on the line 2—2 of Figure 1, and looking in the direction of the arrows.

Figure 3 is a view in section, taken on line 3—3 of Figure 1, and looking in the direction of the arrows.

Figure 4 is a detailed sectional view showing an operating means for the oven door shown in Figures 1 and 2.

Figure 5 is a detailed view in section, showing the oven door and operating means of Figure 4.

Referring to the above drawings, the oven may be formed of rectangular cross section and provided with suitable top insulation 10 and side insulation 11 upon opposite sides thereof. If desired, the oven may be placed upon supporting standards 12 in order that it may be maintained at a desired height, the oven chamber being defined by a top plate 13, side plates 14, back plate 15, and hearth 16. The front of the oven may be closed by a suitable door arrangement which preferably is of the form shown in Figures 1 and 2. This door is shown at 17 and may be formed of a plurality of insulating sections 18, hinged at 19 and adapted to slide in a doorway 20 formed in the top of the oven. Inner guides 21 and outer guides 22 serve to position the oven door properly when in a closed position and also serve as guide tracks for the door when it is to be moved to an open position.

The oven is heated by separate heat sources, each having separate flue passes. These heat sources are termed "top" and "bottom" heat sources, the bottom heat sources being provided by means of a combustion chamber 23, formed beneath the hearth 16. Front and back burners 24 and 25, respectively, are provided in the chamber 23, these burners preferably being positioned at different levels and a horizontal partition 26 being placed between the same in order that the secondary air supplied to the burners may not mingle. In this fashion, partition 26 prevents the mingling of the products of combustion from burner 24 with the secondary air which is supplied to burner 25, the partition further serving as a means for preheating the secondary air supplied to the burner 25. Inasmuch as the secondary air to burner 25 is preheated, it is found, in practice, that substantially less fuel may be used by burner 25 to maintain the temperature of the rear portion of the hearth the same as the temperature of the front portion. The foregoing construction is of such character as to enable a uniform temperature to be maintained in all portions of the hearth 16.

Secondary air for the burners 24 and 25 enters through the open front portion of the combustion chamber 23 and the products of combustion pass out through an opening 23' and into a flue 27 at the rear of the combustion chamber 23. Obviously, primary air is supplied to the burners 24 and 25 in the usual fashion, it being unnecessary to illustrate the particular primary air supply for these burners herein.

Top heat is supplied to the oven from side combustion chambers 28 which are positioned adjacent the side walls 14, flue passes 29 being formed in the side walls 14 to permit the heated products of combustion from the top heat chambers 28 to pass into the top of the oven. Burners 30 are provided in the combustion chambers 28, secondary air being supplied to the burners 30 either from the bottom of the chambers 28 which may be open, or from side ducts 31. After the top heat from the combustion chambers 28 piles down upon the hearth 16, the top heat escapes from the oven through an opening 32 in the back wall 15, flowing away through a flue 33. Primary air is supplied to the burners 30 in the same fashion that it is supplied to the burners 24 and 25. In addition to serving as a source of top heat, the side combustion chambers 28 afford a source of radiant heat by means of which the sides of the interior of the oven are indirectly heated inasmuch as the top heat combustion chambers 28 are placed against the side walls 14. This top heat may be controlled effectively by the burners 30 independently of the bottom heat control afforded by the burners 24 and 25. The positioning of the top and bottom heat sources is such as to utilize, efficiently, the heat from all of the heat sources and enable the effective regulation thereof to afford a uniform desired oven temperature.

In Figures 4 and 5, a door operating means is shown consisting of an operating shaft 34 upon which a suitable operating means such as a wheel 35 is secured. This shaft may be journaled in brackets 36, secured to the top 13 of the oven and is provided with sprocket wheels 37 which pass through apertures 38, formed in the top wall 13. The door sections are preferably provided with recessed grooves 39 at the ends thereof, studs 40 projecting thereinto to be engaged by the teeth of sprockets 37. In this fashion, the oven door may be effectively operated. Obviously, other door operating means may be utilized without departing from the scope of this invention.

The foregoing construction provides an oven which may be used either singly or in multiples, the elements thereof being so designed as to enable the units to be stacked vertically or placed side by side. In case the units are to be stacked vertically, the flues 33 and 27 should not extend above the level of the top of the oven and the secondary air supply for the top heat burners should not be obstructed by adjacent ovens. This merely requires the proper positioning of the inlets for the secondary air supply for these burners and obviously falls within the scope of an ordinary skilled mechanic.

While the invention has been described with specific reference to the construction shown in the accompanying drawings, it is not to be limited, save as defined by the appended claims.

We claim as our invention:

1. An oven having a baking chamber formed by top, back and side walls and a hearth, means to heat the bottom of the hearth, combustion chambers independent of the bottom heating means formed by the side walls and communicating with the baking chamber, and means to carry off gases from the baking chamber.

2. An oven having a baking chamber and a hearth therein, means to supply bottom heat to the hearth, a flue behind the oven to carry off gases from the bottom heat supply, combustion chambers at the sides of the oven independent of the bottom heating means partially formed by the oven side walls and having apertures communicating with the baking chamber adjacent the top thereof, and a flue communicating with the baking chamber adjacent the level of the hearth to carry off gases from above the hearth.

3. An oven having a baking chamber and a hearth therein, a bottom heat chamber beneath the hearth, a flue through which gases may be discharged from the bottom heat chamber, a burner in the bottom heat chamber adjacent the front of the oven, and a burner in the chamber lying in a plane between and spaced from the front and back of the chamber, the burners being so disposed that the first burner supplies heat to the entire hearth and the second burner supplies heat only to the portion of the hearth between the said last named burner and the back of the hearth.

4. An oven having a baking chamber and a hearth therein, a bottom heat chamber beneath the hearth, a flue through which gases may be discharged from the bottom heat chamber, a burner in the bottom heat chamber adjacent the front of the oven, a burner in the chamber lying in a plane between and spaced from the front and back of the chamber, and a partition between the burners, the burners and partition being so disposed that the first burner supplies heat to the entire hearth and the second burner supplies heat only to the portion of the hearth between the said last named burner and the back of the hearth.

5. An oven having a baking chamber and a hearth therein, a bottom heat chamber beneath the hearth open at the front of the oven, a flue at the back of the oven through which gases may be discharged from the bottom heat chamber, a burner in the bottom heat chamber adjacent the front of the oven, and a burner in the chamber adjacent the central plane thereof, the burners being so disposed that the first burner supplies heat to the entire hearth and the second burner supplies heat only to the portion of the hearth between the said last named burner and the back of the hearth.

6. An oven having a baking chamber and a hearth therein, a bottom heat chamber beneath the hearth open at the front of the oven, a flue at the back of the oven through which gases may be discharged from the bottom heat chamber, a burner in the bottom heat chamber adjacent the front of the oven, a burner in the chamber lying in a plane between and spaced from the front and back of the chamber, and a horizontal partition between the burners.

7. An oven having a baking chamber and a hearth therein, a bottom heat chamber beneath the hearth open at the front of the oven, a flue at the back of the oven through which gases may be discharged from the bottom heat chamber, a burner in the bottom heat chamber adjacent the front of the oven, a horizontal partition beneath the burner and spaced from the bottom of the bottom heat chamber, said partition extending rearwardly, and a second burner beneath the partition at the back thereof.

8. An oven having a baking chamber and a hearth therein, a bottom heat chamber beneath the hearth open at the front of the oven, a flue at the back of the oven through which gases may be discharged from the bottom heat chamber, a burner in the bottom heat chamber adjacent the front of the oven, a horizontal partition beneath the burner and spaced from the bottom of the bottom heat chamber, said partition extending rearwardly to substantially the central plane of the oven and being open above and below the partition at the front thereof, and a second burner beneath the partition at the back thereof.

ROBERT H. STANIFORD.
CARLTON W. ROLL.